United States Patent [19]
Moreland et al.

[11] Patent Number: 6,111,576
[45] Date of Patent: Aug. 29, 2000

[54] METHOD AND APPARATUS FOR PROVIDING SELECTED MENU FUNCTIONS AS AN ATTACHMENT MENU BAR ON GRAPHIC USER INTERFACE SYSTEMS

[75] Inventors: Paula Jean Moreland; Stewart Earle Nickolas; Bruce Alan Tate, all of Austin, Tex.

[73] Assignee: International Business Machines Corporation, Armonk, N.Y.

[21] Appl. No.: 08/554,062

[22] Filed: Nov. 6, 1995

[51] Int. Cl.[7] ...................................................... G06F 15/00
[52] U.S. Cl. ............................................. 345/353; 345/356
[58] Field of Search ....................................... 395/352, 353, 395/357, 348, 326, 339; 345/326–358, 145

[56] References Cited

U.S. PATENT DOCUMENTS

| | | | |
|---|---|---|---|
| 4,334,124 | 6/1982 | Imsand et al. ............................. | 178/19 |
| 5,010,500 | 4/1991 | Makkuni et al. ......................... | 364/521 |
| 5,155,836 | 10/1992 | Jordan et al. ............................ | 395/500 |
| 5,414,810 | 5/1995 | Doyle et al. ............................. | 395/342 |
| 5,425,140 | 6/1995 | Bloomfield et al. ..................... | 345/353 |
| 5,428,782 | 6/1995 | White ....................................... | 395/650 |
| 5,517,606 | 5/1996 | Matheny et al. ......................... | 395/352 |
| 5,530,796 | 6/1996 | Wang ....................................... | 395/352 |
| 5,559,945 | 9/1996 | Beaudet et al. .......................... | 395/352 |

*Primary Examiner*—Steven Sax
*Attorney, Agent, or Firm*—Michael Balconi-Lamica; Leslie A. Van Leeuwen

[57] ABSTRACT

A method and apparatus for coupling a user-created window, or object, to menu functions of another application is accomplished once functions of another program have been selected and an attachment menu bar is created. The attachment menu bar is then graphically attached to the user-created object. When one of the selected menu functions is invoked, the system performs the function indicated by the selected function on an object within the user-created object or on the user-created object.

16 Claims, 4 Drawing Sheets

METHOD AND APPARATUS FOR PROVIDING SELECTED MENU FUNCTIONS AS AN ATTACHMENT MENU BAR ON GRAPHIC USER INTERFACE SYSTEMS

TECHNICAL FIELD OF THE INVENTION

This invention relates generally to computer software applications and more particularly to generation of menu functions.

BACKGROUND OF THE INVENTION

Computers have undergone dramatic changes over the last fifteen years. In the early days of the personal computer (PC), command instructions were primarily entered through a plurality of keystrokes using archaic code words. For one to benefit from the use of a computer, one would have to be relatively fluent with computer user language. Thus, computer usage was limited to a relatively small percentage of people who had the necessary computer use training.

Today, however, computers are utilized and usable by almost anybody with relative ease. Such increase in the ease of use has come from the use of graphical user interface (GUI) systems or programs. The GUI systems or programs allow a user to invoke computer functions visually, without the need for entering archaic code words. For example, a user can drag a cursor over a particular application, click a mouse button, and open the application. Once the application is open, additional GUI icons, widgets, or props, indicate to the user what functions can be evoked, plus information as to how to use the application.

Not only have the past fifteen years made computer operation easier, it has also made computer programming easier. For example, Visual Basics, manufactured by Microsoft, allows a programmer to create his or her own user windows which include a user-defined menu. Thus, when a programmer is creating a particular computer program application, that program can have an associated window such that the end user can benefit from the GUI system.

While such technological advances have made computer programming and computer use easier, there still is room for further advancements. For example, there is no convenient way to couple user-created windows or objects with menu functions of other applications or main applications. Such is the case for programmer-created user windows that are nested or used within another window application program.

Therefore, a need exists for a method and apparatus that allows convenient coupling of user-created windows with menu functions of other applications.

DETAILED DESCRIPTION OF A PREFERRED EMBODIMENT

Generally, the present invention provides a method and apparatus for coupling a user-created window, or object, to menu functions of another application. This is generally accomplished once functions of another program have been selected and an attachment menu bar is created. The attachment menu bar is then graphically attached to the user-created object. When one of the selected menu functions is evoked, the system performs the function indicated by the selected function on an object within the user-created object or on the user-created object. With such a method and apparatus, the present invention allows menu functions of other applications to be coupled to user-created objects or windows.

Figure 1:
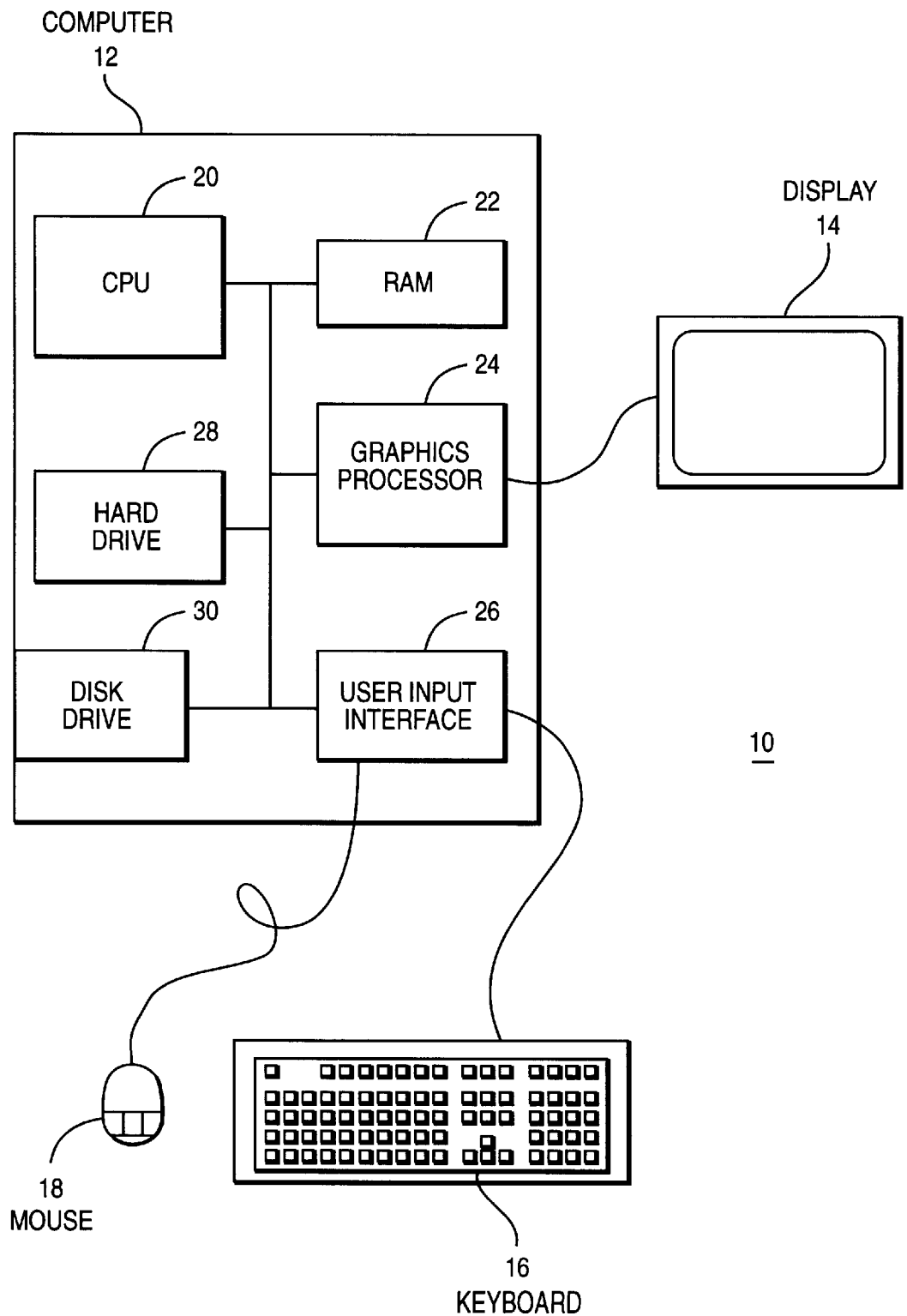
FIG. 1 illustrates a computer system, or graphical user interface system, that may incorporate the teachings of the present invention.

FIG. 1 illustrates a computer system, or graphical user interface system, 10. The system 10 includes a computer 12 coupled to a display 14, a keyboard 16, and a mouse 18. The computer 12 includes a central processing unit 20 operably coupled to random access memory 22, a graphics processor 24, a user input interface 26, a hard drive 28, and a disk drive 30. Each of these elements is well known in the art; thus, no further description will be presented regarding these elements other than to further illustrate the concepts of the present invention.

Figure 2:
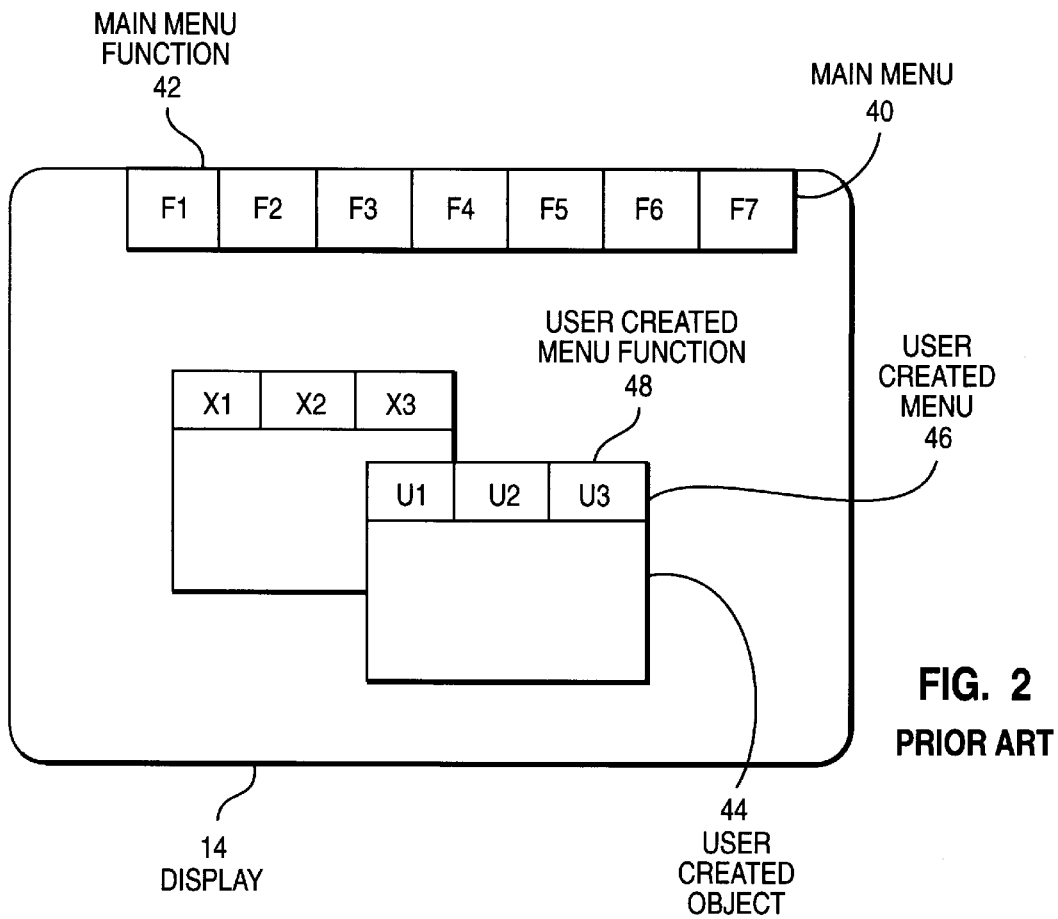
FIG. 2 illustrates a typical display screen of a prior art window or user-created object.

FIG. 2 illustrates a display screen of a prior art system. As shown, the display 14 illustrates a menu function 40 which includes a plurality of main menu functions 40 (shown as F1–F7).

Also shown is a pair of user-created objects 44. Each user-created object includes a user-created menu 46 and, within the user-created menu, is a plurality of user-created menu functions 48. As mentioned in the Background section, these user-created objects 44 may be generated by a computer programmer such that the end user of a computer program can utilize a graphic user interface system to invoke operations of the newly created computer application. Additionally, the user created objects may be user created text files, graphics files, windows, or any other object in which other application functions may be used.

As can be seen from FIG. 2, when a user is operating within the user-created object 44, the user may select any one of the user-created menu functions 48. If, however, the user desires to utilize one of the main menu functions 42 in connection with the user-created object, the user must select a particular menu function which transfers the application level from the user-created object to the application associated with the main menu.

This, as is known to computer users, is inconvenient in that it requires extra time and steps to access and utilize main menu functions 42 on user-created object 44.

Figure 3:
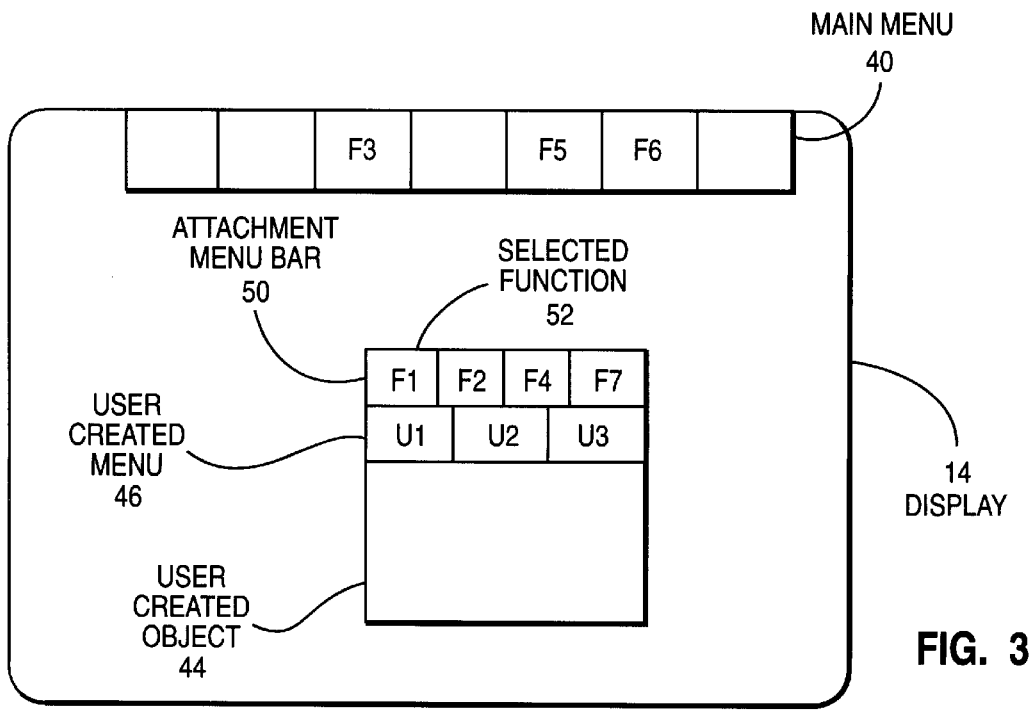
FIG. 3 illustrates a user-created object coupled to an attachment menu bar in accordance with the present invention.

FIG. 3 illustrates the display 14 illustrating the main menu 40 and the user-created object 44. In addition, the display 14 also shows an attachment menu bar 50 which includes a plurality of selected functions 52. The selected functions 52 are chosen by the programmer from the main menu 40. As shown, the attachment menu bar 50 is graphically attached to, or coupled to, the user-created object 44. When the user moves the window on the display 14, the attachment menu bar 50 will track the movement of the user-created object 44, and vice versa, such that the attachment menu bar will maintain its relative location regardless of where the user-created object or the menu bar is moved. In addition, when a user is operating within the user-created object 44 and desires to access one of the selected functions 52, the user simply clicks on one of the selected functions, and it invokes the particular function upon a desired object within the user-created object or upon the user-created object itself. Thus, the user does not have to select from the main menu bar and switch the level of application being processed.

Figure 4:
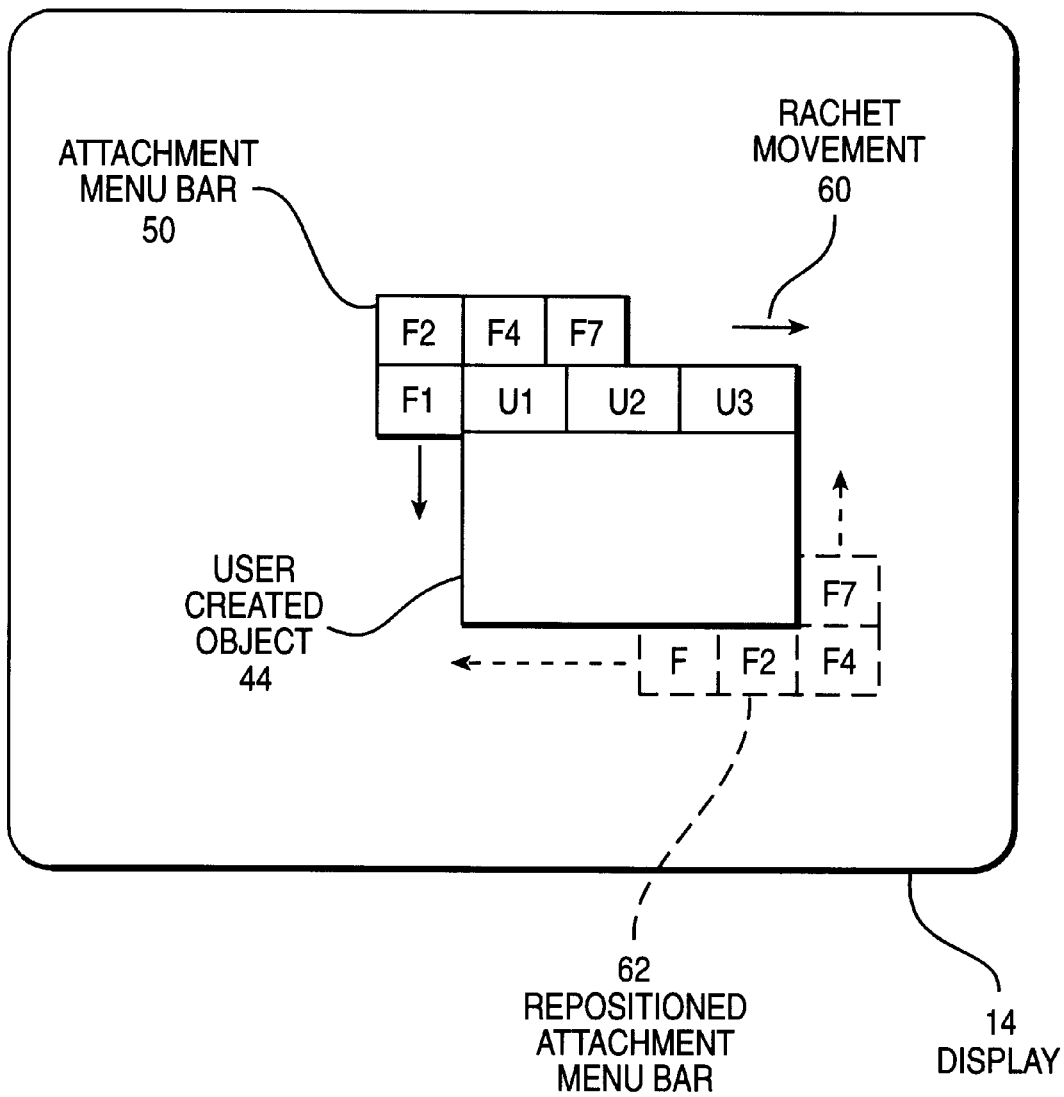
FIG. 4 illustrates a display of a user-created object that has a menu bar which may be ratcheted around the object in accordance with the present invention.

FIG. 4 illustrates a feature of the present invention which allows the attachment menu bar 50 to be moved around the user-created object 44. As shown, the ratchet movement 60 may be to the left or to the right of the user-created object. As the user selects and rotates, or ratchets, the attachment menu bar 50 around the user-created object 44, an audio and/or visual feedback indicator of such movement may be indicated. The user may reposition the attachment menu bar as illustrated by the repositioned attachment menu bar 62. This feature allows the end user to customize the visual appearance of the user-created object in conjunction with the attachment menu bar 50.

Figure 5:
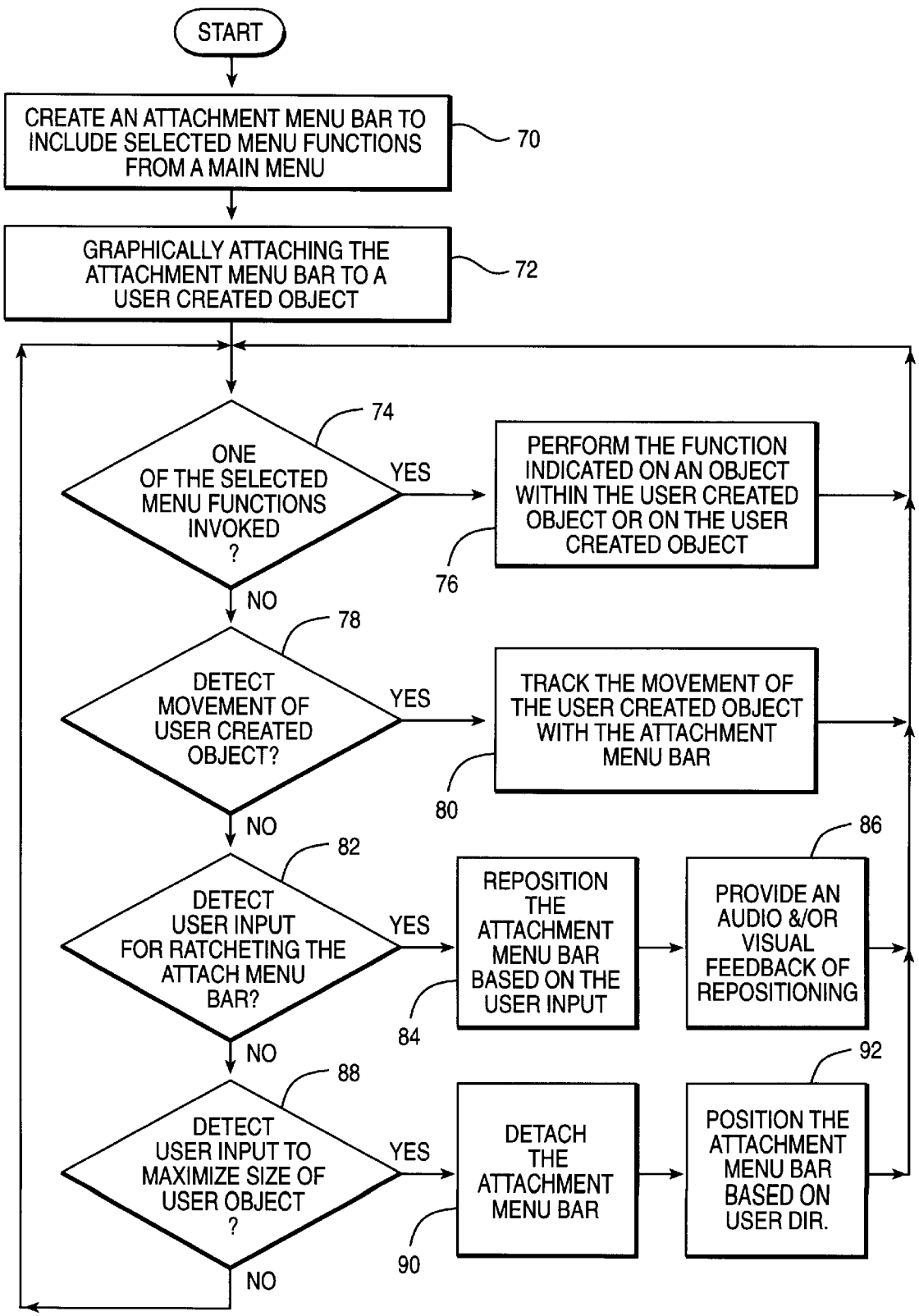
FIG. 5 illustrates a logic diagram that may be used to implement the present invention.

FIG. 5 illustrates a logic diagram that may be used to implement the present invention. This method may be stored on any computer readable storage medium such as a computer disk, magnetic tape, the hard drive 28 (of FIG. 1), CD ROM, or any other means for storing digital information. The process begins at step 70 wherein an attachment menu bar is created to include selected menu functions from a main menu. As previously mentioned, the selected menu functions may be from another computer application or a computer application being used to create the user-created object, or window. Having created the attachment menu bar, the process proceeds to step 72 wherein the attachment menu bar is graphically attached to a user-created object. As mentioned above with reference to FIG. 3, the graphic attachment places the attachment menu bar in physical connectivity with the user-created object.

After the attachment menu bar has been attached, the process proceeds to step 74 wherein it determines whether one of the selected menu functions has been invoked. If so, the process proceeds to step 76 wherein the particular selected function is performed upon an object within the user-created object or on the user-created object itself. In essence, this step pulls the menu function of another application into the user-created object such that, to the computer user, it appears as one application as instead of two. After performing the function, the process returns to step 74.

If, however, a selected function is not invoked, the process proceeds to step 78 wherein the process remains in a loop of waiting to detect either movement of the user-created object at step 78, user input for ratcheting the attachment menu bar at step 82, or to detect user input to maximize the size of the user object at step 88. If none of these operations are detected or invoked, the process remains in a loop of testing steps 74, 78, 82, and 88 until an activity is detected.

If the process detects movement of a user-created object at step 78, the process proceeds to step 80. At step 80, the process tracks the movement of the user-created object with the attachment menu bar. As discussed with reference to FIG. 3, when the user-created object is moved on the display, the attachment menu bar tracks its movement such that it remains in a relative position to the user-created object. In other words, it appears to be part of the user-created object. After completing the movement, the process returns to step 74.

When the process detects user input for ratcheting the attachment menu bar at step 82, the process proceeds to step 84. At step 84, the process repositions the attachment menu bar based on the user input. As mentioned with reference to FIG. 4, the repositioning, or ratcheting, of the attachment menu bar may be in any direction. While repositioning the attachment menu bar, the process contemporaneously performs step 86 to provide an audio and/or visual feedback of the incremental repositioning of the attachment menu bar. Once the attachment menu bar has been repositioned, the process returns to step 74.

When the process detects the user input to maximize the size of the user object step 88, the process proceeds to step 90. At step 90, the process detaches the attachment menu bar from the user-created object. After detaching the attachment menu bar, the process proceeds to step 92 wherein the attachment menu bar is repositioned based on user directives. Thus, when the user-created object fills the screen, the user can reposition the detached attachment menu bar anywhere on the screen and still be able to invoke the menu functions of the attachment menu bar as previously discussed.

The present invention provides a method and apparatus for coupling menu functions of an application to a user-created object. With such a method and apparatus, computer application user may access menu functions from multiple computer applications as if they were all in one application.

What is claimed is:

1. On a graphic user interface system, a method for providing selected menu functions of a main menu for attachment to a user created object that contains a user created menu, the method comprises the step of:
   a) creating an attachment menu bar that includes the selected menu functions of said main menu;
   b) graphically attaching the attachment menu bar to the user created object, wherein said user created object comprises a user created menu; and
   c) when one of the selected menu functions is invoked, performing a function indicated by the one of the selected menu functions on an object within the user created object or on the user created object.

2. The method of claim 1, wherein step (b) further comprises the steps of:
   detecting movement of the user created object; and
   tracking the movement of the user created object with the attachment menu bar such that the attachment menu bar remains in a substantially similar physical position with respect to the user created object.

3. The method of claim 1 further comprises the steps of:
   detecting user input for ratcheting the attachment menu bar around the user created object; and
   repositioning the attachment menu bar based on the user input.

4. The method of claim 3 further comprises the step of:
   providing a feedback indicator that indicates incremental repositioning of the attachment menu bar.

5. The method of claim 1 further comprises the steps of:
   detecting user input to maximize screen size of the user created object;
   detaching the attachment menu bar from the user created object; and
   positioning the attachment menu bar based on user directives.

6. The method of claim 1, wherein step (b) further comprises the step of:
   attaching the attachment menu bar to the user created object, wherein the user created object includes a window.

7. On a graphic user interface system, a method for providing selected functions for attachment to a user created object, the method comprises the steps of:

a) creating an attachment menu bar that includes the selected functions of another object;

b) graphically attaching the attachment menu bar to the user created object, wherein said user created object comprises a user created menu; and c) when one of the selected functions is invoked, performing a function indicated by the one of the selected functions on at least a portion of the user created object.

8. A computer readable storage medium for storing program instructions that, when read by a computer, causes the computer to provide menu functions of a main menu for attachment to a user created object that contains a user created menu, the computer readable storage medium comprises:

first storage means for storing program instructions that cause the computer to create an attachment menu bar that includes the selected menu functions of said main menu;

second storage means for storing program instructions that cause the computer to graphically attach the attachment menu bar to the user created object wherein said user created object comprises a user created menu; and third storage means for storing program instructions that cause the computer, when one of the selected menu functions is invoked, to perform a function indicated by the one of the selected menu functions on an object within the user created object or on the user created object.

9. The computer readable storage medium of claim 8, wherein the second storage means further comprises the functions of:

storing program instructions that cause the computer to detect movement of the user created object; and storing program instructions that cause the computer to track the movement of the user created object with the attachment menu bar such that the attachment menu bar remains in a substantially similar physical position with respect to the user created object.

10. The computer readable storage medium of claim 8 further comprises:

fourth storage means for storing program instructions that cause the computer to detect user input for ratcheting the attachment menu bar around the user created object; and fifth storage means for storing program instructions that cause the computer to reposition the attachment menu bar based on the user input.

11. The computer readable storage medium of claim 10 further comprises:

sixth storage means for storing program instructions that cause the computer to provide a feedback indicator that indicates incremental repositioning of the attachment menu bar.

12. The computer readable storage medium of claim 8 further comprises:

fourth storage means for storing program instructions that cause the computer to detect user input to maximize screen size of the user created object;

fifth storage means for storing program instructions that cause the computer to detach the attachment menu bar from the user created object; and sixth storage means for storing program instructions that cause the computer to position the attachment menu bar based on user directives.

13. The computer readable storage medium of claim 8, wherein the second storage means further comprises the functions of:

storing program instructions that cause the computer to attach the attachment menu bar to the user created object, wherein the user created object includes a window.

14. A computer readable storage medium for storing program instructions that, when read by a computer, cause the computer to provide selected functions for attachment to a user created object, the computer readable storage medium comprises:

first storage means for storing program instructions that cause the computer to create an attachment menu bar that includes the selected functions of another object;

second storage means for storing program instructions that cause the computer to graphically attach the attachment menu bar to the user created object, wherein said user created object comprises a user created menu; and third storage means for storing program instructions that cause the computer, when one of the selected functions is invoked, to perform a function indicated by the one of the selected functions on at least a portion of the user created object.

15. On a graphic user interface system, a method for providing selected functions for attachment to a user created object, the method comprises the step of:

a) copying selected menu functions of another object;

b) graphically attaching an attachment menu bar to the user created object, said attachment menu bar comprising said selected menu functions copied from said another object; and c) when one of the selected menu functions is invoked, performing a function indicated by one of the selected menu functions on at least a portion of the user created object.

16. A computer readable storage medium for storing program instructions that, when read by a computer, cause the computer to provide selected functions for attachment to a user created object, the computer readable storage medium comprises:

first storage means for storing program instructions that cause the computer to copy selected menu functions of another object;

second storage means for storing program instructions that cause the computer to graphically attach the attachment menu bar to the user created object, said attachment menu bar comprising said selected menu functions of said another object; and third storage means for storing program instructions that cause the computer, when one of the selected menu functions is invoked, to perform a function indicated by the one of the selected menu functions on an object within the user created object or on the user created object.

* * * * *